Dec. 13, 1938.  H. SCHUCHARDT ET AL  2,140,191
GYROMAGNETIC COMPASS
Filed Feb. 4, 1938   2 Sheets-Sheet 1
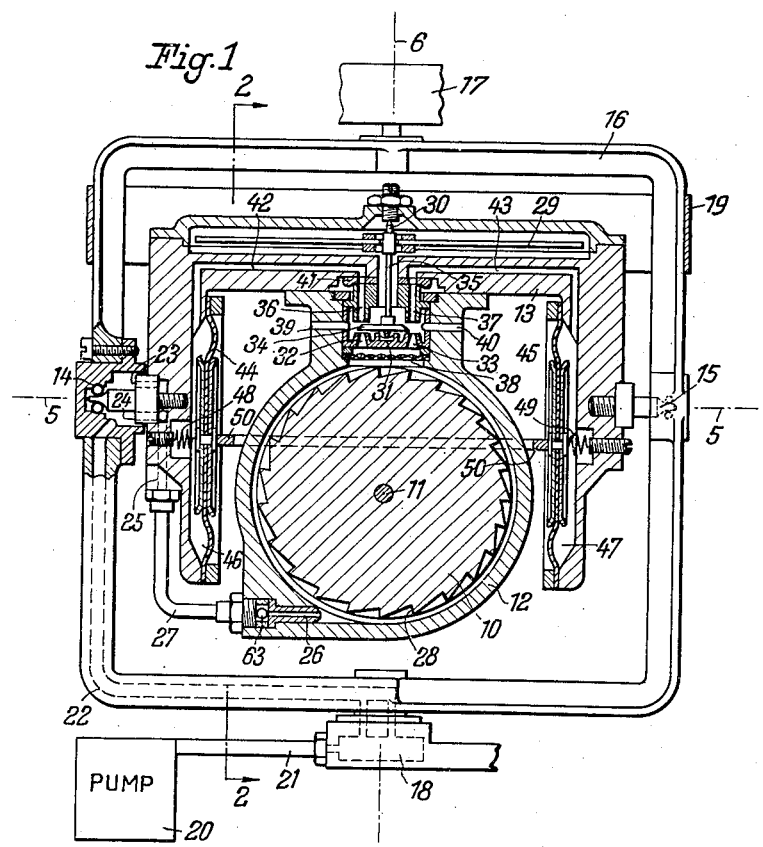
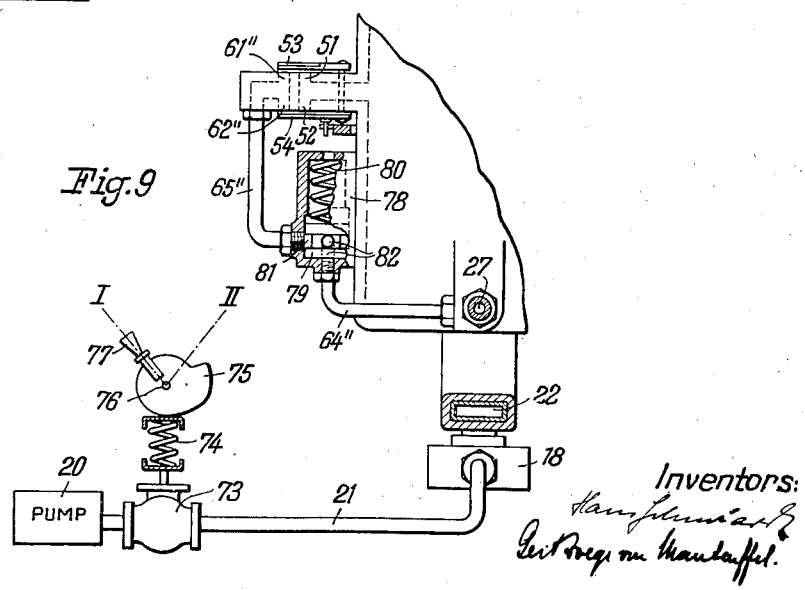
Inventors:

Dec. 13, 1938. H. SCHUCHARDT ET AL 2,140,191
GYROMAGNETIC COMPASS
Filed Feb. 4, 1938 2 Sheets-Sheet 2
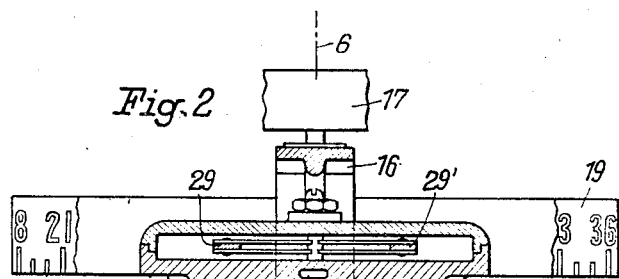
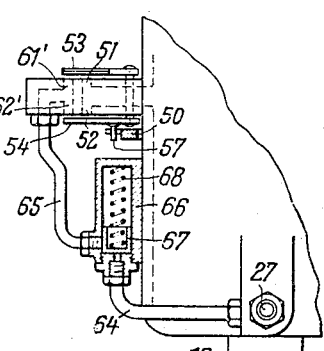
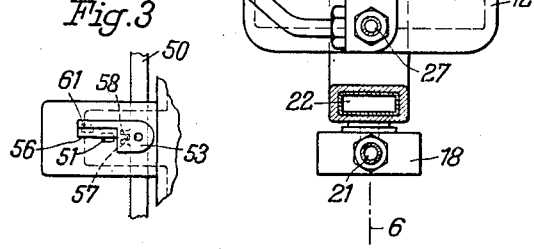
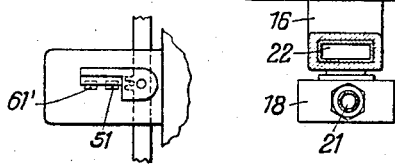
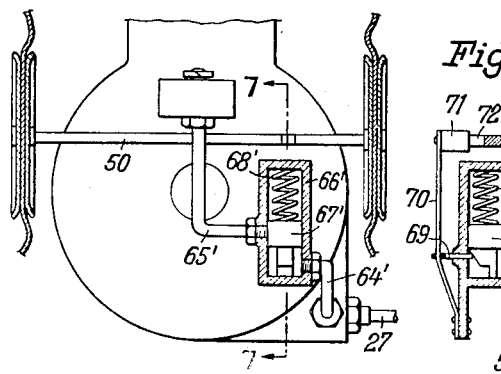
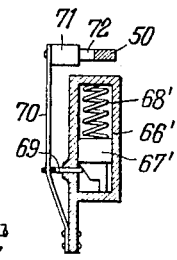
Inventors:

Patented Dec. 13, 1938

2,140,191

UNITED STATES PATENT OFFICE 2,140,191

GYROMAGNETIC COMPASS

Hans Schuchardt and Gert Zoege von Manteuffel, Berlin, Germany, assignors to Askania-Werke A. G., a corporation of Germany Application February 4, 1938, Serial No. 188,750

19 Claims. (Cl. 33—222)

This invention relates to improvements in directional instruments of the type containing a gyroscope which is prevented from wandering by means of a pivotally mounted magnetic element causing correcting torques to be exerted on the gyroscope for maintaining the gyroscope in agreement with the average position of the magnetic element. Instruments of this type are generally called gyro-magnetic compasses.

In order to obtain a steady indication from the gyroscope undisturbed from the usual oscillations of the magnetic element the correcting torques exerted on the gyroscope are made small to create slow precessional movements of a magnitude of about one degree per minute. When a gyromagnetic compass of the conventional type is put into operation with the gyroscope initially in a position differing from the position of the magnetic element, it follows that a considerable time will elapse before the gyroscope is moved into agreement with the magnetic element, inasmuch as the precessional movements of the gyroscope are slow. In the conventional type of instrument, for example, having a precessional velocity of one degree per minute, one hour and a half will pass until the gyroscope is moved into agreement with the magnetic element after an initial deviation of 90 degrees.

It is accordingly an object of this invention to provide in a gyro-magnetic compass means for rapidly precessing the gyroscope into agreement with the magnetic element to obtain reliable indications from the gyroscope very shortly after the instrument is put in operation by starting the gyro rotor and by supplying with power the torque exerting means for precessing the gyroscope.

The invention is partly based on the well-known physical law that the precessional velocity of a gyroscope is directly proportional to the torque exerted on the gyroscope and inversely proportional to the product of the moment of inertia of the gyro rotor with respect to the axis of rotation and the angular velocity of the gyro rotor. Expressed as an equation, the law appears thus:

$$\omega y = \frac{Md}{I_x \cdot \omega_x}$$

wherein $\omega y$ represents the precessional velocity;
$Md$ represents the torque exerted on the gyroscope;
$I_x$ represents the moment of inertia of the gyro rotor with respect to the rotor axis;
$\omega_x$ represents the angular velocity of the rotor.

Inasmuch as the moment of inertia of the gyro rotor is a constant of the instrument, it follows that the precessional velocity may be increased by increasing the torque exerted on the gyroscope and by maintaining small at the same time the angular velocity of the gyro rotor.

We believe that this theoretical consideration is very helpful in understanding some of the principles of the invention hereinafter set forth in detail, but do not wish in any way to limit the scope of this invention by a possible incorrectness of the theory.

Aims, objects, and advantages of this invention will appear from a consideration of the description which follows with the accompanying drawings showing for purely illustrative purposes embodiments of this invention. It is to be understood, however, that the description is not to be taken in a limiting sense, the scope of this invention being defined in the appended claims.

Referring to the drawings:

Fig. 1 is a side elevation, partly in section, of a form of a gyromagnetic compass.

Fig. 2 is a front elevation of the instrument shown in Fig. 1 incorporating one form of the invention, a section being taken on line 2—2.

Fig. 3 is a plan view of some elements shown in elevation in Fig. 2.

Fig. 4 shows in elevation a modified form of the invention.

Fig. 5 is a plan view of some elements shown in elevation in Fig. 4.

Fig. 6 shows in elevation the form of the invention shown in Fig. 5 with an added feature which will be explained more fully hereinafter.

Fig. 7 is a side elevation of some elements shown in Fig. 6, a section being taken on line 7—7.

Fig. 8 is a plan view of some elements shown in Fig. 7.

Fig. 9 shows in elevation and partly diagrammatically another form of the invention.

A gyro rotor 10 is mounted with its shaft 11 for rotation about an axis 4—4 (Fig. 2) in a rotor casing 12 secured to or forming part of a support 13. The support 13 is mounted in journals 14 and 15 in a vertical frame 16 about a substantially horizontal axis 5—5, the vertical frame being rotatable in fixed bearings 17 and 18 about a substantially vertical axis 6—6. The vertical frame may be provided with an annular card 19 bearing directional graduations.

The gyroscope of the illustrated example is of the air driven type, air being supplied from a pump diagrammatically indicated at 20 through a conduit 21 to the hollow bearing 18. The air passing through the bearing 18 enters a hollow passage 22 in the vertical ring leading to the hollow bearing 14 having passages 23 and 24. A further conduit 25 communicates with the passages in the hollow bearing 14 and is connected to a driving nozzle 26 through a pipe 27. The driving nozzle 26 issues a jet of compressed air against blades or teeth 28 at the circumference of the gyro rotor. The air used for driving the rotor leaves the rotor casing through passages later to be described.

For preventing the gyroscope from wandering in azimuth about the axis 6—6 a magnetic element is provided including permanent magnets 29 and 29' which are pivotally mounted in bearings 30 and 31 in the support 31 and the rotor bearing casing 12, respectively.

For determining relative deviations in azimuth of the gyroscope and the magnetic element a positional pick-off or relay is shown in the illustrated example including a pair of nozzles 32 and 33 differentially covered and uncovered by an eccentric disk 34 on the shaft 35 of the magnetic element and a pair of reception orifices 36 and 37 in which differential pressures are set up depending upon the relative position of the disk 34 and the nozzles 32 and 33.

A part of the air used for driving the rotor is admitted to the nozzles 32 and 33, the turbulence of the air being eliminated by a screen 38. Air exhausted through the nozzles 32 and 33 leaves the casing through apertures 39 and 40 in the rotor bearing casing.

When a relative deviation in azimuth between the magnetic element and the gyroscope occurs, a differential pressure impulse is created by the relay, the pressures being transmitted through apertures in a packing 41 and adjoining conduits 42 and 43 in the support 13 to act on a servomotor shown in the illustrated embodiment as being a pair of flexible diaphragms 44 and 45 forming chambers 46 and 47 with the support 13. The diaphragms are biased towards a normal position by means of springs 48 and 49 and connected through a rectangular frame 50.

Means for applying a torque about the axis 5—5 in response to relative deviations of the magnetic element and the gyroscope are provided and shown in the illustrated embodiment as being of the pneumatic type. A pair of exhaust ports 51 and 52 communicating with the interior of the rotor bearing casing to be supplied with another portion of the used air are provided for this purpose. The discharge of air through the port 51 and 52 is controlled in the illustrated embodiment by a pair of shutters 53 and 54 secured to a common shaft 55 rotatably mounted in the casing and having knife edges one of which is visible at 56. The shutters normally permit equal amounts of air to escape through ports 51 and 52 acting in opposite direction about the axis 5—5. One of said shutters is provided with a pin 57 engaged in a fork 58 of the rectangular frame 50.

When a relative deviation of the gyroscope and the magnetic element occurs, the frame 50 is moved by the servo-motor in one direction or the other resulting in a differential increase and decrease of the discharge of air through the ports 51 and 52, whereby reaction torques about the axis 5—5 are created for slowly precessing the gyroscope into agreement with the magnetic element.

For preventing inclinations of the rotor axis 4—4 with respect to the horizontal a gravity controlled device is shown for exerting air reaction torques about the axis 6—6, whereby a precessional movement is caused about the axis 5—5 correcting the inclinations. One of the pair of ports is visible at 59 communicating with the interior of the gyro rotor casing for a supply with used air and controlled by a pendulous shutter 60.

For rapidly precessing the gyroscope into agreement with the magnetic element upon substantially relative deviations in azimuth, such as may occur at the beginning of the operation of the instrument, a second torque applying device is shown in Fig. 2 including a second pair of ports 61 and 62 spaced from the ports 51 and 52 and staggered relatively thereto, the ports being controlled by the same shutters 53 and 54 which also control the first pair of ports 51 and 52. The second pair of ports are supplied with unused high-pressure air through a conduit 63 communicating with the supply pipe 27. The operation of this form of the invention is as follows:

During normal deviations of the gyroscope and the magnetic element, such as occur during normal operation of the instrument, the second torque applying device operated with power of a higher potential is inoperative. In the illustrated form of the invention the ports 61 and 62 are normally closed by the shutters 53 and 54. When the relative deviation of the gyroscope and the magnetic element is great as may be the case, when the instrument is put in operation, the rectangular frame 50 is moved a considerable distance, whereby a strong torque is exerted on the gyroscope causing a rapid precessional movement of the same. When the gyroscope has moved into agreement with the magnetic element, the second torque applying device is rendered inoperative again, the shutters 53 and 54 closing ports 61 and 62. During normal operation of the instrument the precessional movements of the gyroscope caused by the low pressure ports 51 and 52 are slow, whereby a steady indication of the direction is ensured and quick oscillations in response to the usual oscillations of the magnetic element are prevented.

Another embodiment of this invention is shown in Figs. 4 and 5. A first torque-applying device operating with power of low potential is shown again as including ports 51 and 52 controlled by shutters 53 and 54. The shutters 53 and 54 are operated through the rectangular frame 50 engaging the pin 57. A second torque applying device operated with power of high potential is shown in the form of a second pair of ports 61' and 62' spaced from the first pair of ports 51 and 52, but aligned therewith as shown at Fig. 5. The ports 61' and 62' are controlled by the same shutters 53 and 54 which also control the first pair of ports. Power of high potential is supplied to the second torque applying device. In the illustrated embodiment high pressure air is supplied to the second pair of ports from the high pressure pipe 27 through pipes 64 and 65 interrupted by a device for admitting power upon initial supply of power to the instrument and for shutting off the supply of power at a predetermined time thereafter.

In the illustrated example, this device includes a cylinder 66 in which a piston 67 is movable acted upon by the pressure in the pipe 64 and controlling an outlet port to which the pipe 65 is connected. The piston 67 is normally held in a position in which the outlet port 65 is closed through a compresesion spring 68.

The operation of the device shown in Figs. 4 and 5 is as follows:

Upon an initial supply of air to the gyroscope the pressure in the pipe 64 causes the piston to move into its uppermost position in which the spring 68 is compressed, thereby admitting air through the pipe 65 to the second pair of ports 61' and 62'. The second torque applying device will thus assist the first torque applying device and cause a rapid precession of the gyroscope into agreement with the magnetic element. High pressure air acting on one side of the piston 67 will now slowly leak past the piston and build up a back pressure until after a certain time depending upon the accuracy with which the piston is fitted into the cylinder the back pressure on the piston is equal to the pressure inside the conduit 64. The piston now being only under action of the spring 68 will now be moved into its lowermost position shutting off the supply of high pressure air to the second pair of ports 61' and 62'. The time of travel of the piston from its uppermost into its lowermost position can easily be made long enough to permit the gyroscope to precess into the proper position relatively to the magnetic element to correct even the greatest deviations which may occur.

The device shown in Fig. 4 for admitting and after a predetermined time shutting off the supply of power to the second torque applying device may be somewhat modified by adding to the device a releasable detent mechanism for the purpose of ensuring a supply of power to the second torque applying device until the gyroscope has precessed into agreement with the magnetic element. This modification is shown in Figs. 6 to 8.

The supply conduit leading to the second pair of ports including pipes 64' and 65' is interrupted by a cylinder 66' in which a piston 67' is movable against the action of a spring 68'. The piston 67' is provided with an extension at the bottom cooperating with a detent, in the illustrated example shown as being a pin 69 and a flat spring 70 tending to push the pin inwardly. To the upper end of the flat spring a projection 71 is secured cooperating with a cam surface 72 on the rectangular frame 50.

When upon an initial supply of compressed air the piston is moved into its uppermost position, the pin will move inwardly under the action of the flat spring and arrest the piston in a position in which the port leading to the pipe 65' is open. Compressed air will thus be supplied to the second pair of ports until the gyroscope has precessed into agreement with the magnetic element. Upon agreement the cam surface on the frame will strike the projection, whereupon the spring will move the piston into its lowermost position shutting off the supply of compressed air to the second pair of ports.

It has been set forth hereinbefore that the precessional velocity of the gyroscope is directly proportional to the torque applied to the gyroscope and inversely proportional to the rotor speed. It is therefore desirable to maintain the rotor speed low until the gyroscope has assumed its proper position relatively to the magnetic element. Power medium of a low potential is therefore supplied to the gyroscope during the time prior to the positional adjustment of the gyroscope relatively to the magnetic element.

In the embodiment of the invention shown in Fig. 9 a device is shown in which compressed air is again used as a power medium for the gyroscope and the torque applying device. A manually adjustable spring loaded valve including a valve housing 73, a compression spring 74, and a cam 75 pivotally mounted at 76 and movable by means of a handle 77 controls the potential in this example the pressure of the air supplied from the pump 20 through the conduit 21 to the gyroscope. Air of equal pressure is supplied to the rotor nozzle and the second torque applying device through the pipe 27. Conduits 64" and 65" carry compressed air to the ports 61" and 62" controlled in the usual manner by shutters 53 and 54. The conduits 64" and 65" are interrupted by a pressure responsive valve including a valve casing 78 in which a valve member 79 is movable against the action of a spring 80. The valve member 79 is provided with an annular groove 81 permitting a passage of air from the pipe 64" to the pipe 65" through a passage 82.

The operation of the device is as follows:

For starting the instrument the handle 77 of the valve is moved into the position I in which compressed air of low pressure enters the gyroscope driving the rotor at a slow rate. The valve 79 is in its lowermost position permitting compressed air to be supplied to the second pair of ports 61" and 62" for rapidly precessing the gyroscope. After a certain time, when the gyroscope has moved into alignment with the magnetic element, the operating pressure is increased by moving the handle 77 into the second position II in which the cam 75 compresses the spring 74 adjusting the valve for a higher pressure. The increase in pressure causes an increase in speed of the gyro rotor. Air of increased pressure conducted to the pressure responsive valve acts on the bottom of the valve, whereby the valve member moves into its uppermost position against the action of the spring 80 shutting off with its lower cylindrical part the valve part leading to the second pair of ports. Experiments have shown that gyromagnetic compass equipped with the device of Fig. 9 will move into its proper position after a 90 degrees' deviation in about three minutes, while a gyromagnetic compass equipped only with the low pressure operated torque applying device for maintaining the gyroscope in proper alignment with the magnetic element would require approximately one hour and a half for the same adjustment.

Obviously, the present invention is not restricted to the particular embodiments herein shown and described. Power media other than compressed air may be used, for example, for driving the rotor and for actuating torque applying devices. Moreover, it is not indispensable that all the features of this invention be used conjointly, since they may be employed advantageously in various combinations and subcombinations.

What is claimed is:

1. In a gyro-magnetic compass a gyro rotor support mounted for movement about a first substantially vertical and a second substantially horizontal axis; a gyro rotor mounted thereon for spinning about a third substantially horizontal axis normal to said second axis; a magnetic element mounted for movement in azimuth; first means for exerting on said support relatively weak torques about said second axis; second means for exerting on said support relatively strong torques about said second axis; and control means connected to be actuated upon a relative displacement of said support and element for rendering effective upon small deviations said first torque means while rendering ineffective said second means and for additionally rendering effective said second means upon deviations exceeding a predetermined magnitude, whereby upon deviations exceeding a predetermined magnitude the support is precessed into agreement with said element at an increased rate.

2. In a gyro-magnetic compass a gyro rotor support mounted for movement about a first substantially vertical and a second substantially horizontal axis; a gyro rotor mounted thereon for spinning about a third substantially horizontal axis normal to said second axis; a magnetic element pivotally mounted on said support; first means for exerting on said support relatively weak torques about said second axis; second means for exerting on said support relatively strong torques about said second axis; control means for rendering effective and ineffective said first and second torque means; a relay connected to be actuated upon a relative displacement of said support and element; and a servo-motor operated by said relay and connected to actuate said control means.

3. In a gyro-magnetic compass a gyro rotor support mounted for movement about a first substantially vertical and a second substantially horizontal axis; a gyro rotor mounted thereon for spinning about a third substantially horizontal axis normal to said second axis; a magnetic element pivotally mounted on said support; first means for exerting on said support relatively weak torques about said second axis; second means for exerting on said support relatively strong torques about said second axis; movable control means for rendering effective said first and said second torque means upon small and great actuating movements, respectively; a relay connected to be actuated upon a relative displacement of said support and element; and a servo-motor operated by said relay and connected to actuate said control means, whereby upon deviations exceeding a predetermined magnitude the support is precessed into agreement with said element at an increased rate.

4. In a gyro-magnetic compass a gyro rotor support mounted for movement about a first substantially vertical and a second substantially horizontal axis; a gyro rotor mounted thereon for spinning about a third substantially horizontal axis normal to said second axis; a magnetic element pivotally mounted on said support; first power actuated torque exerting means for exerting on said support relatively weak torques about said second axis; second power actuated torque exerting means for exerting on said support relatively strong torques about said second axis; means for supplying said first and second torque means with power; control means for rendering effective and ineffective said first and said second torque means; a relay connected to be actuated upon a relative displacement of said support and element; a servo-motor operated by said relay and connected to actuate said control means; and means connected to be operated by said servo-motor for shutting off the power supply to said second torque means upon relative displacements of said support and element of a lesser than predetermined magnitude.

5. In a gyro-magnetic compass a gyro rotor support mounted for movement about a first substantially vertical and a second substantially horizontal axis; a gyro rotor mounted thereon for spinning about a third substantially horizontal axis normal to said second axis; a magnetic element pivotally mounted on said support; a first pair of oppositely directed exhaust ports for exerting on said support air reaction torques about said second axis; a second pair of oppositely directed exhaust ports for exerting on said support air reaction torques about said second axis; means for supplying said first and said second pair of ports with air under pressure; flow controlling means for differentially decreasing and increasing in succession the discharge of air through said first and said second pair of ports, whereby unbalance air reactions are created about said second axis; a relay connected to be actuated upon a relative displacement of said support and element; and a servo-motor operated by said relay and connected to actuate said flow controlling means, whereby upon relative deviations of said element and support exceeding a predetermined magnitude the support is precessed into agreement with said element at an increased rate.

6. In a gyro-magnetic compass a gyro rotor support mounted for movement about a first substantially vertical and a second substantially horizontal axis; a gyro rotor mounted thereon for spinning about a third substantially horizontal axis normal to said second axis; a magnetic element pivotally mounted on said support; a first pair of oppositely directed exhaust ports for exerting on said support air reaction torques about said second axis; a second pair of oppositely directed exhaust ports for exerting on said support air reaction torques about said second axis; means for supplying said first pair of ports with air under pressure; means for supplying said second pair of ports with air of a higher pressure than supplied to said first pair of ports; flow controlling means for differentially decreasing and increasing in succession the discharge of air through said first and said second pair of ports, whereby unbalance air reactions are created about said second axis; a relay connected to be actuated upon a relative displacement of said support and element; and a servo-motor operated by said relay and connected to actuate said flow controlling means, whereby upon deviations of said element and support exceeding a predetermined magnitude the support is precessed into agreement with said element at an increased rate.

7. In a gyro-magnetic compass a gyro rotor casing mounted for movement about a first substantially vertical and a second substantially horizontal axis; a gyro rotor mounted therein for spinning about a third substantially horizontal axis normal to said second axis; pneumatic means including a nozzle for driving the rotor; a magnetic element pivotally mounted on said casing; a first pair of oppositely directed exhaust ports communicating with the interior of said casing, said pair of ports being arranged to exert on said casing air reaction torques about said second axis; a second pair of oppositely directed exhaust ports for exerting on said casing air reaction torques about said second axis, said second pair of ports being arranged in staggered relation relatively to said first ports; means for supplying said second pair of ports with air under pressure; shutters for differentially covering and uncovering in succession said first and said second pair of ports, whereby an unbalance of the air reactions is created; a relay connected to be actuated upon a relative displacement of said casing and element; and a servo-motor operated by said relay and connected to actuate said shutters, whereby upon relative deviations of said element and casing exceeding a predetermined magnitude the casing is precessed into agreement with said element at an increased rate.

8. In a gyro-magnetic compass a gyro rotor support mounted for movement about a first substantially vertical and a second substantially horizontal axis; a gyro rotor mounted thereon for spinning about a third substantially horizontal axis normal to said second axis; power actuated driving means for spinning the rotor; a magnetic element mounted for movement in azimuth; first power actuated means for exerting on said support relatively weak torques about said second axis; second power actuated means for exerting on said support relatively strong torques about said second axis; control means connected to be actuated upon a relative displacement of said support and element for jointly controlling said first and second torque exerting means; means for supplying said driving and said torque exerting means with power; and means actuated by an initial supply of power to said driving means for admitting, and after a predetermined time shutting off, the supply of power to said second torque exerting means, whereby upon an initial starting of the rotor and relative deviations of said support and element strong torques are exerted on said support causing the same to precess into agreement with the element at an increased rate.

9. In a gyro-magnetic compass a gyro rotor support mounted for movement about a first substantially vertical and a second substantially horizontal axis; a gyro rotor mounted thereon for spinning about a third substantially horizontal axis normal to said second axis; power actuated driving means for spinning the rotor; a magnetic element mounted on said support for movement in azimuth; first power actuated means for exerting on said support relatively weak torques about said second axis; second power actuated means for exerting on said support relatively strong torques about said second axis; a relay connected to be actuated upon a relative displacement of said support and element; a servo-motor operated by said relay and connected to control said first and second torque exerting means; means for supplying said driving and said torque exerting means with power; and means actuated by an initial supply of power to said driving means for admitting, and after a predetermined time shutting off, the supply of power to said second torque exerting means, whereby upon an initial starting of the rotor and relative deviations of said support and element strong torques are exerted on said support causing the same to precess into agreement with the element at an increased rate.

10. In a gyro-magnetic compass a gyro rotor support mounted for movement about a first substantially vertical and a second substantially horizontal axis; a gyro rotor mounted thereon for spinning about a third substantially horizontal axis normal to said second axis; air jet means for driving the rotor; a magnetic element pivotally mounted on said support; a first pair of oppositely directed exhaust ports for exerting on said support air reaction torques about said second axis; a second pair of oppositely directed exhaust ports for exerting on said support air reaction torques about said second axis; means for supplying said first and said second pair of ports and said air jet means with air under pressure; flow controlling means for differentially decreasing and increasing the discharge of air through said first and said second pair of ports, whereby unbalance air reactions are created about said second axis; a relay connected to be actuated upon a relative displacement of said support and element; a servo-motor operated by said relay and connected to actuate said flow controlling means; and means actuated by an initial supply of air to said air jet means for admitting, and after a predetermined time shutting off, the supply of air to said second pair of ports, whereby upon an initial starting of the rotor and relative deviations of said support and element strong torques are exerted on the support causing the same to precess into agreement with the element at an increased rate.

11. In a gyro-magnetic compass a gyro rotor casing mounted for movement about a first substantially vertical and a second substantially horizontal axis; a gyro rotor mounted therein for spinning about a third substantially horizontal axis normal to said second axis; pneumatic means including a nozzle for driving the rotor; a magnetic element pivotally mounted on said casing; a first pair of oppositely directed exhaust ports communicating with the interior of said casing, said pair of ports being arranged to exert on said casing air reaction torques about said second axis; a second pair of oppositely directed exhaust ports for exerting on said casing air reaction torques about said second axis; means for supplying said second pair of ports with air under pressure; shutters for differentially covering and uncovering said first and second pair of ports, whereby an unbalance of the air reactions is created; a relay connected to be actuated upon a relative displacement of said casing and element; a servo-motor operated by said relay and connected to actuate said shutters; and means actuated by an initial supply of air to said nozzle for admitting, and after a predetermined time shutting off, the supply of air to said second pair of ports, whereby upon an initial starting of the rotor and relative deviations of said support and element strong torques are exerted on the support causing the same to precess into agreement with the magnetic element at an increased rate.

12. In a gyro-magnetic compass a gyro motor casing mounted for movement about a first substantially vertical and a second substantially horizontal axis; a gyro rotor mounted therein for spinning about a third substantially horizontal axis normal to said second axis; pneumatic means including a nozzle for driving the rotor; a magnetic element pivotally mounted on said casing; a first pair of oppositely directed exhaust ports communicating with the interior of said casing, said pair of ports being arranged to exert on said casing air reaction torques about said second axis; a second pair of oppositely directed exhaust ports for exerting on said casing air reaction torques about said second axis; means for supplying said second pair of ports with air under pressure; shutters for differentially covering and uncovering said first and second pair of ports, whereby an unbalance of the air reaction is created; a relay connected to be actuated upon a relative displacement of said casing and element; a servo-motor operated by said relay and connected to actuate said shutters; a valve connected to admit and shut off air supplied to said second pair of ports, said valve including a cylinder having an inlet and an outlet port the inlet port communicating with the driving nozzle, a piston movable in said cylinder and controlling one of said valve ports, and means for biasing the piston toward the closed position, whereby upon starting of the rotor by an initial supply of air to the driving nozzle the valve is opened admitting air to said second pair of ports for creating strong torques for rapidly precessing the casing into agreement with the magnetic element, while after a predetermined time the biasing means move the valve towards the closed position shutting off the supply of air to said second pair of ports.

13. In a gyro-magnetic compass a gyro rotor casing mounted for movement about a first substantially vertical and a second substantially horizontal axis; a gyro rotor mounted therein for spinning about a third substantially horizontal axis normal to said second axis; pneumatic means including a nozzle for driving the rotor; a magnetic element pivotally mounted on said casing; a first pair of oppositely directed exhaust ports communicating with the interior of said casing, said pair of ports being arranged to exert on said casing air reaction torques about said second axis; a second pair of oppositely directed exhaust ports for exerting on said casing air reaction torques about said second axis; means for supplying said second pair of ports with air under pressure; shutters for differentially covering and uncovering said first and second pair of ports, whereby an unbalance of the air reaction is created; a relay connected to be actuated upon a relative displacement of said casing and element; a servo-motor operated by said relay and connected to actuate said shutters; a valve connected to admit and shut off the supply of air to said second pair of ports, said valve including a cylinder having an inlet port communicating with the driving nozzle and an outlet port, a piston movable in said cylinder and controlling said outlet port, and means for biasing the piston towards the closed position, a detent for maintaining the piston in the open position, and cam means operable by said servo-motor for releasing said detent, whereby upon starting of the rotor by an initial supply of air to the driving nozzle the valve is opened admitting air to said second pair of ports for creating strong torques for rapidly precessing the casing into agreement with the magnetic element, whereupon the supply of air to the second pair of ports is shut off and slow precessional movements are created by said first pair of ports.

14. In a gyro-magnetic compass a gyro rotor support mounted for movement about a first substantially vertical and a second substantially horizontal axis; a gyro rotor mounted thereon for spinning about a third substantially horizontal axis normal to said second axis; power actuated driving means for spinning the rotor; a magnetic element mounted for movement in azimuth; first power actuated means for exerting on said support relatively weak torques about said second axis; second power actuated means for exerting on said support relatively strong torques about said second axis; control means connected to be actuated upon a relative displacement of said support and element for jointly controlling said first and second torque exerting means; a control member actuated by an initial supply of power to said driving means for admitting and shutting off the supply of power to said second torque exerting means; means for biasing said control member towards the shutoff position; a releasable detent for maintaining said control member in a position in which power is admitted to said second torque exerting means; and means connected to be actuated by a relative displacement of said support and element for releasing said detent upon agreement of said support and element, whereby upon starting of the rotor by an initial supply of power to said driving means power is admitted to said second torque exerting means and the support precessed rapidly into agreement with said magnetic element, whereupon the detent is released and the supply of power to said second torque exerting means is interrupted.

15. In a gyro-magnetic compass a gyro rotor support mounted for movement about a first substantially vertical and a second substantially horizontal axis; a gyro rotor mounted thereon for spinning about a third substantially horizontal axis normal to said second axis; power actuated driving means for spinning the rotor; a magnetic element mounted on said support for movement in azimuth; first power actuated means for exerting on said support relatively weak torques about said second axis; second power actuated means for exerting on said support relatively strong torques about said second axis; a relay connected to be actuated upon a relative displacement of said support and element; a servo-motor operated by said relay and connected to control said first and second torque exerting means; a source of power connected to said driving and said torque exerting means; a control member actuated by an initial supply of power to said driving means for admitting and shutting off power to said second torque exerting means; means for biasing said control member towards a shut-off position; a releasable detent for maintaining said control member in a position in which power is admitted to said second torque exerting means; cam means operated by said servo-motor for releasing the detent upon agreement of said support and element, whereby upon starting of the rotor by an initial supply of power to said driving means power is admitted to said second torque exerting means, and the support moved rapidly into agreement with said magnetic element, whereupon the detent is released and the supply of power to said second torque exerting means interrupted.

16. In a gyro-magnetic compass a gyro motor support mounted for movement about a first substantially vertical and a second substantially horizontal axis; a gyro rotor mounted thereon for spinning about a third substantially horizontal axis normal to said second axis; power actuated driving means for spinning the rotor; a magnetic element mounted for movement in azimuth; first power actuated means for exerting on said support relatively weak torques about said second axis; second power actuated means for exerting on said support relatively strong torques about said second axis; control means connected to be actuated upon a relative displacement of said support and element for jointly controlling said first and second torque exerting means; a control member responsive to the potential of power supplied to said driving means for admitting upon low potential and shutting off upon high potential power to said second torque exerting means, whereby upon starting the rotor with power of low potential said second torque exerting means are rendered operative and the support precessed rapidly into agreement with said magnetic element, while upon driving the rotor with power of high potential the second torque exerting means are shut off.

17. In a gyro-magnetic compass a gyro rotor support mounted for movement about a first substantially vertical and a second substantially horizontal axis; a gyro rotor mounted thereon for spinning about a third substantially horizontal axis normal to said second axis; power actuated driving means for spinning the rotor; a magnetic element mounted on said support for movement in azimuth; first power actuated means for exerting on said support relatively weak torques about said second axis; second power actuated means for exerting on said support relatively strong torques about said second axis; a relay connected to be actuated upon a relative displacement of said support and element; a servo-motor operated by said relay and connected to control said first and second torque exerting means; a source of power connected to said driving and said torque exerting means; a control member responsive to the potential of power supplied to said driving means for admitting upon low potential and shutting off upon high potential power to said second torque exerting means, whereby upon starting the rotor with power of low potential said second torque exerting means are rendered operative and the support precessed rapidly into agreement with said magnetic element, while upon driving the rotor with power of high potential the second torque exerting means are shut off.

18. In a gyro-magnetic compass a gyro rotor casing mounted for movement about a first substantially vertical and a second substantially horizontal axis; a gyro rotor mounted therein for spinning about a third substantially horizontal axis normal to said second axis; a nozzle on said casing for driving the rotor; a magnetic element pivotally mounted on said casing; a first pair of oppositely directed exhaust ports communicating with the interior of said casing, said pair of ports being arranged to exert on said casing air reaction torques about said second axis; a second pair of oppositely directed exhaust ports for exerting on said casing air reaction torques about said second axis; means for supplying said nozzle and said second pair of ports with air under pressure; shutters for differentially covering and uncovering said first and second pair of ports, whereby unbalance air reaction torques are created; a relay connected to be actuated upon a relative displacement of said casing and element; a servo-motor operated by said relay and connected to actuate said shutters; and a valve responsive to the pressure of the air supplied to said nozzle for admitting air to said second pair of ports upon low pressures and shutting off said second pair of ports upon pressures exceeding a predetermined magnitude, whereby upon starting the rotor with low pressure air said second torque exerting means are rendered operative and the casing is precessed rapidly into agreement with said magnetic element, while upon driving the rotor with high pressure air the second torque exerting means are shut off and the casing is precessed slowly.

19. In a gyro-magnetic compass a gyro rotor casing mounted for movement about a first substantially vertical and a second substantially horizontal axis; a gyro rotor mounted therein for spinning about a third substantially horizontal axis normal to said second axis; a nozzle on said casing for driving the rotor; a magnetic element pivotally mounted on said casing; a first pair of oppositely directed exhaust ports communicating with the interior of said casing, said pair of ports being arranged to exert on said casing air reaction torques about said second axis by issuing used air from the casing; a second pair of oppositely directed exhaust ports spaced from said first ports for exerting on said casing air reaction torques about said second axis; means for supplying said nozzle and said second pair of ports with air under pressure; a pair of shutters for differentially covering and uncovering both said first and second pair of ports, whereby unbalance air reactions are created; a relay connected to be actuated upon a relative displacement of said casing and element; and a servo-motor operated by said relay and connected to actuate said pair of shutters.

HANS SCHUCHARDT.
GERT ZOEGE von MANTEUFFEL.